United States Patent [19]

Ichiyanagi et al.

[11] 4,140,382
[45] Feb. 20, 1979

[54] DRIVE CONTROL CIRCUIT OF MOTOR DRIVE UNIT

[75] Inventors: Toshikazu Ichiyanagi, Mitaka; Tomonori Iwashita, Fuchu, both of Japan

[73] Assignee: Canon Kabushiki Kaisha, Tokyo, Japan

[21] Appl. No.: 720,585

[22] Filed: Sep. 7, 1976

[30] Foreign Application Priority Data

Sep. 10, 1975 [JP] Japan .................................. 50-109811

[51] Int. Cl.² .............................................. G03B 1/18
[52] U.S. Cl. .................................................. 354/173
[58] Field of Search .............. 354/171, 173, 204, 205, 354/206, 212, 213, 214, 60 R; 318/375, 379, 380; 352/121, 137, 169, 175

[56] References Cited

U.S. PATENT DOCUMENTS

| | | | |
|---|---|---|---|
| 3,582,747 | 6/1971 | Kearns | 318/379 |
| 3,820,141 | 6/1974 | Aizawa et al. | 354/171 |
| 4,021,826 | 5/1977 | Iwata et al. | 354/173 |

Primary Examiner—Richard A. Wintercorn
Assistant Examiner—William B. Perkey
Attorney, Agent, or Firm—Toren, McGeady and Stanger

[57] ABSTRACT

The brake transistor connected across the winding of a film winding motor is provided with a capacitor connected to the base so that when the power supply for the motor is stopped, the charging of the capacitor is initiated and causes flow of a base current to the transistor.

3 Claims, 2 Drawing Figures

DRIVE CONTROL CIRCUIT OF MOTOR DRIVE UNIT

BACKGROUND OF THE INVENTION

This invention relates to motor drive units, and more particularly to camera motor drive units with photographic cameras wherein the drive control circuit for an electric motor is provided with braking means.

It is known to supply a drive control circuit for a film winding electric motor with a brake transistor that short-circuits the motor winding when the motor is to be stopped. Such conventional motor drive control circuit, however, require the use of a diode such as diode D connected, as shown in FIG. 1, between an energy supply control switch S and the winding of the motor M all of them are connected in series with the source of energy or battery E. The dopde D is arranged between the base and emitter electrodes of the brake transistor Tr. When switch S is opened at the termination of a film feeding stroke to deenergize the motor M, the brake transistor Tr is rendered conductive momentarily by by virtue of a base current supplied as an induction voltage produced in the winding of the motor, while nevertheless preventing the direct application of the induction voltage to the base of brake transistor Tr. Hence the tendency of the motor to travel past the end of a feeding stroke is minimized in this way. This arrangement of the diode D gives rise to the disadvantage of having to employ a battery of high voltage and capacity because a large drop of voltage through the diode D occurs when the power supply for the motor M is energized from the battery E in series with the diode D.

SUMMARY OF THE INVENTION

An object of the present invention is to provide an improved motor drive control circuit in the form of a motor drive unit usuable with a photographic camera.

Another object of the invention is to increase the reliability and accuracy with which the tendency of a film winding motor to travel past the end of a feeding stroke is minimized.

Still another object of the invention is to provide a drive control circuit of a motor drive unit which can operate with a power source of smaller capacity at lower voltage level than was heretofore necessary.

These and other objects of the invention and its various features of novelty will be more thoroughly understood upon reading the following detailed description of an illustrative apparatus embodying those novel features by reference to the accompanying drawings in which:

DETAILED DESCRIPTION OF THE PRESENT EMBODIMENT

Figure 1:
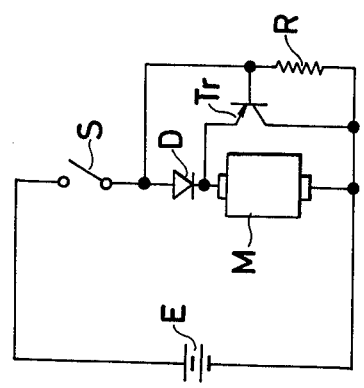
FIG. 1 is a circuit diagram showing a simplified example of the conventional drive control circuit of a motor drive unit.
Figure 2:
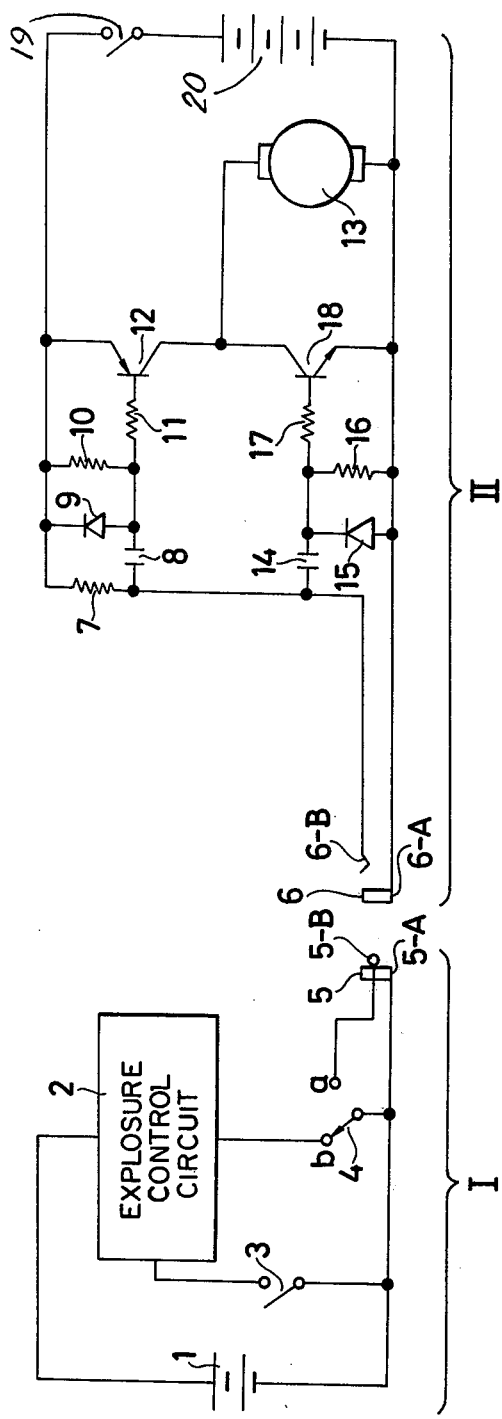
FIG. 2 is a circuit diagram of one embodiment of a drive control circuit of a motor drive unit according to the present invention as adapted for use with a photographic camera.

FIG. 2 shows one embodiment of a drive control circuit of a motor drive unit designated II according to the invention. The unit II is adapted for use with a photographic camera designated I. The latter incorporates an exposure control circuit 2 of known construction with a power source battery 1. A release switch 3 responds to a shutter release button, not shown control circuit 2 is provided with a power supply control switch 4. When the rear shutter curtain not shown runs down to close an exposure aperture of the camera, switch 4 is set from its "b" position to its "a" position. The exposure control circuit 2 is thus rendered inoperative. This switch 4 also serves to control the energizing and deenergizing operation of an electric motor 13 in the motor drive unit II when unit II is attached to camera I through connection between a jack 5 and a plug 6. Here, the terminals 5-A and 5-B being in contact with terminals 6-A and 6-B respectively. This attachment is also accompanied by the coupling of a film winding member of camera I with the output shaft of the film winding motor 13.

The drive control circuit is composed of a switching transistor 12 connected in series with the winding of motor 13 and to a power source battery 20 through a main switch 19 operable from the outside of the unit housing, a base resistor 11 connected to the base electrode of transistor 12, a resistor 10 of high resistance value connected between base resistor 11 and the emitter electrode of transistor 12, a capacitor 8 connected between a point of connection between resistors 10 and 11 and the negative terminal of battery 20 through plug 6, a discharging diode 9 connected across condenser 8 in series with a resistor 7, and a braking circuit.

The braking circuit is composed of a transistor 18 connected in parallel with the winding of motor 13 and having a base electrode connected to the output terminal of a differentiating circuit of resistors 16 and 17 and a capacitor 14, and a discharging diode 15 connected across capacitor 14 through plug 6.

The operation of the circuit of FIG. 2 is as follows. Assuming that camera I is driven by motor drive unit II to expose a frame, when the exposure is terminated, the power supply control switch 4 is set to the "a" position. This occurs when the rear shutter curtain runs down and cover the exposure aperture. Capacitor 8 now draws a base current from switching transistor 12 to energize motor 13 from battery 20. Motor 13 is now rotated to advance the film one frame and to reset the shutter to the cocked position in a manner known in the art.

When the front shutter curtain arrives at the cocked position, the power supply control switch 4 is set to "b". A charging current for capacitor 14 then flows through resistor 7, capacitor 14 and resistor 17 to the base of brake transistor 18. This turns on transistor 18 while transistor 12 is rendered non-conductive.

At this time, motor 13, because of its having an inertia, tends to rotate further and produce an induction voltage across the winding of motor 13. This induction voltage causes flow of a current through transistor 18 to effect braking action on motor 13. Thus the tendency of motor 13 to rotate past the end of a feeding stroke is minimized.

The differentiating circuit of the braking circuit is dimensioned so that as soon as motor 13 is stopped, brake transistor 18 is rendered non-conductive. On the other hand, the differentiating circuit of the power supply circuit is dimensioned so that, in a short time interval after one feed stroke necessary to advance the film one frame is completed, switching transistor 12 is rendered non-conductive. In the latter connection, it should be explained that when the final frame exposure is terminated, the film can not be advanced further. In order to prevent rotation of motor 13 despite of the fact that transistor 12 is rendered conducting to energize motor 13, the power supply control switch 4 is not set from position "a" position to "b". Otherwise the power supply use time would be elongated.

It will be seen from the foregoing that the described embodiment of the present invention accomplishes the above mentioned objects by providing a capacitor connected to the base of a brake transistor connected parallel to the advance of a film winding motor so that the brake transistor can be momentarily rendered conductive to effect braking action on the motor without the necessity of using a diode which would be otherwise connected in the power supply circuit of the conventional diode drive control circuit. This makes it possible to employ a battery of lower voltage level than was heretofore necessary because there is no need to take into account the voltage drop.

What is claimed is:

1. A motor drive unit adapted for use with a photographic camera, comprising:
    a) a motor,
    b) a battery for supplying electric energy to the motor;
    c) drive means including, a motor drive circuit having first electronic switching means connected in series with the battery and the motor, and a first time control circuit controlling the driving time of the motor drive circuit, said first time control circuit being connected to and opening the electronic switching means after a lapse of a first predetermined time;
    d) motor brake means, said means including a motor brake circuit having second electronic switching means connected to the motor, and a second time control circuit connected to the second electronic switching means so as to turn on the second switching means for a second predetermined time,
    e) electrical means for exhibiting an on-state and an off-state associated with the actuation of the camera, said electrical means being connected to the first time control circuit and the second time control circuit for starting the timing operation of the first time control circuit and resetting the second time control circuit when the electrical means assumes one of the two states and for starting the timing operation of the second time control circuit and resetting the first time control circuit when the electrical means assumes the other state,
    f) the first time control circuit and the second time control circuit producing a drive control signal for turning on the first switching means and a brake control signal for turning on the second switching means in a given relation in response to the activation of the electrical means, the motor being driven when the electrical means is in one state and braked by the motor brake means through the second time control circuit, the motor being stopped after the first predetermined time irrespective of the state of the switching means.

2. A drive unit adapted for use with a photographic camera, producing a motor control signal, and comprising:
    a) a motor,
    b) a battery for supplying electrical energy to the motor,
    c) a motor drive circuit having first switching means and connecting the battery and the motor,
    d) a first time control circuit connected to the switching means for turning off the switching means after a first predetermined time,
    e) a motor brake circuit having second switching means and connected across the motor,
    f) a second time control circuit connected to the second switching means for turning the second switching means on during a second predetermined time, and
    g) a connector having one terminal connected to the first time control circuit and the second time control circuit and another terminal being connected to the motor and to the battery, said connector being connectable to the camera for receiving the control signal.

3. A motor drive unit and photographic camera, arrangement which comprises:
    a) a motor,
    b) a battery for supplying an electrical energy to the motor,
    c) a motor drive circuit having switching means connected in a current path between the battery and the motor,
    d) a first time control circuit connected to the switching means and switching the switching means to an off state after a first predetermined time,
    e) a motor brake circuit having a second switching means connected across the motor,
    f) a second time control circuit connected to the second switching means and keeping the second switching means in the switched on state during a second predetermined time,
    g) electrical changing means having an on-state and an off-state associated with the actuation of the camera, said changing means being connected to the first and the second time control circuit for starting the timing operation of the first time control circuit and resetting the second time control circuit when the changing means assumes the one of the two states and for starting the timing operation of the second time control circuit and resetting the first time control circuit when the switching means assumes the other state,
    h) said changing means being connectable to the exposure control circuit,
    i) the first time control circuit and the second time control circuit producing a drive control signal for turning on the first switching means and a brake control signal for turning on the second switching means in a given relation in response to actuation of the camera,
    the motor being driven when the changing means is in the on state and braked by the motor means through the second time control circuit, the motor being stopped after the first predetermined time irrespective of the changing means being in the on state, and
    j) a connector having a pair of plugs and jacks electronically disengageable between the first and the second time control circuit and the changing means.

* * * * *